United States Patent
Ayala et al.

(10) Patent No.: US 8,130,166 B2
(45) Date of Patent: Mar. 6, 2012

(54) COUPLING DEVICE FOR TRANSPONDER AND SMART CARD WITH SUCH DEVICE

(75) Inventors: Stéphane Ayala, Palézieux Gare (CH); Lionel Carre, Seeg (DE); Jari-Pascal Curty, Nyon (CH)

(73) Assignee: Assa Abloy AB (SE)

( * ) Notice: Subject to any disclaimer, the term of this patent is extended or adjusted under 35 U.S.C. 154(b) by 454 days.

(21) Appl. No.: 12/244,137

(22) Filed: Oct. 2, 2008

(65) Prior Publication Data

US 2009/0152362 A1 Jun. 18, 2009

(30) Foreign Application Priority Data

Oct. 3, 2007 (EP) ..................................... 07117825

(51) Int. Cl.
*H01Q 21/00* (2006.01)
(52) U.S. Cl. ......... 343/867; 343/866; 343/895; 307/104
(58) Field of Classification Search .................. 343/895, 343/843, 866, 867; 307/104; 455/428, 433
See application file for complete search history.

(56) References Cited

U.S. PATENT DOCUMENTS

| | | | |
|---|---|---|---|
| 5,574,470 A * | 11/1996 | de Vall | 343/895 |
| 6,378,774 B1 * | 4/2002 | Emori et al. | 235/492 |
| 7,286,053 B1 * | 10/2007 | Gudeman et al. | 340/572.1 |
| 7,692,546 B2 * | 4/2010 | Camp et al. | 340/572.7 |
| 2001/0011012 A1 * | 8/2001 | Hino et al. | 455/90 |
| 2002/0105232 A1 | 8/2002 | Parrault | |

FOREIGN PATENT DOCUMENTS

EP 0 977 145 A2 2/2000

OTHER PUBLICATIONS

European Search Report for Application Serial No. EP 07 11 7825, mailed Mar. 17, 2008, 2 pages.
Written Opinion for Application Serial No. EP 07 11 7825, mailed Mar. 17, 2008, 2 pages.

* cited by examiner

*Primary Examiner* — Jacob Y Choi
*Assistant Examiner* — Shawn Buchanan
(74) *Attorney, Agent, or Firm* — Sheridan Ross P.C.

(57) ABSTRACT

A coupling device is formed by a continuous conductive path having a central section and two extremity sections, the central section forming at least a small spiral for inductive coupling with the transponder device, the extremities sections forming each one large spiral for inductive coupling with the reader device, wherein the small spiral shows a larger pitch than the ones of the large spirals, and wherein the two extremities of the continuous path are loose such that the coupling device forms an open circuit. The pitches of the large spirals are chosen such as that the interturn stray capacitances is important and that the large spirals have mainly a capacitive behavior. And the pitch of the small spiral is chosen such as that the interturn stray capacitances are negligible, and that the small spiral has mainly an inductive behavior.

13 Claims, 3 Drawing Sheets state of the art state of the art electrical equivalent

COUPLING DEVICE FOR TRANSPONDER AND SMART CARD WITH SUCH DEVICE

FIELD OF THE INVENTION

The invention relates to a coupling device for a transponder device and to a smart card comprising a transponder device inductively coupled to a coupling device. The object of the invention is more particularly a coupling device that is easy to manufacture, in particular for contactless or dual-interface cards.

STATE OF THE ART

The technology of an inductive coupling unit is known in the art and was first published for RFID transponders in U.S. Pat. No. 5,270,717, as a solution to provide an extended range transponder/antenna configuration. A standard transponder is coupled to a long and narrow antenna by a loosely coupled coil. This document describes the general principle of an inductive coupling device.

A coupling device for a transponder generally comprises a primary antenna configured for long range communication with an external RFID reader and a secondary antenna connected in series, wherein the secondary antenna is configured as such to be inductively coupled to an antenna of the transponder device.

Inductive coupling, also called magnetic, capacitive or reactive coupling, is defined in contrast to direct electrical coupling by electrically conductive material. References in the present description to inductive, magnetic, capacitive or reactive coupling refer to a coupling that is predominantly or primarily inductive, magnetic, capacitive or reactive. It will be appreciated that a coupling that is primarily inductive may also include some capacitive coupling. Conversely, a coupling that is primarily capacitive may also include some inductive (magnetic) coupling as a secondary coupling mechanism. Systems using primarily inductive coupling are referred to herein as inductive coupling, and systems using primarily capacitive coupling are referred to herein as capacitive coupling.

This technology has been extensively used for manufacturing non-contact cards. As an example, FIG. 1 illustrates the disclosure made in U.S. Pat. No. 5,955,723. A transponder unit comprises a chip 1 with an antenna 2 and an inductive coupling device, comprising a primary antenna 3 and a secondary antenna 4 connected in series. All the elements are integrated in the card body and aim to extend the range and the quality of the communication of the transponder unit, in particular in the case of a non-contact card.

A similar approach for RFID smart card is described in EP 0 931 295. A module is provided with an antenna on the module, and the module is fixed in a recess of the card substrate accommodated with an inductive coupling device. The mounting is achieved in such a way that the antenna on the module is inductively coupled with the secondary antenna of the coupling device. Similar modules with such antennas are disclosed in EP 0 875 039 and WO 07 026 077. This solution is particularly interesting for dual (contact and non-contact) interface modules.

An alternative is presented in EP 0 977 145, where an antenna is formed directly on the surface of the chip, when the primary and secondary antennas of the coupling device are formed on a module board on which the chip is going to be mounted by the flip-chip method. This kind of small transponders (chip and antenna together) is called coil-on-chip and is known in the art and largely distributed on the market.

In all the documents of the prior art cited above, a coupling device working with a transponder unit is proposed. The chip is electrically connected to the larger antenna (the primary antenna of the coupling device) without physical connection. Such units are much more resistant to mechanical stress than the ones using traditional connecting means such as pads, studs or wires. The antenna of the transponder is kept small (about the size of the chip or of the module) and is mounted on the same rigid structure as the chip. It can be the chip itself or in/on the chip packaging (as a chip module).

In the configurations disclosed above dipole, patch, slot, spiral, wire, single-loop, multi-loops and various hybrid antenna types are also suitable. The mechanism for generating the magnetic field in the magnetic coupling device may vary based on the antenna type or configuration. All types of coupling, at low frequency (LF: 30-300 kHz), high frequency (HF: 3-30 MHz) or ultra high frequency (UHF: over 300 MHz) are possible.

A focus of this technology is to find a simple and effective mass production process to manufacture the coupling device. The problem is that all elements of the coupling device have to be tuned accurately in order to obtain the desired transmission characteristic and performance of the whole system (coupling device+transponder device). This is illustrated for example in the equation giving the mutual inductance in EP 1 325 468.

Many solutions are proposed today that all involve a multiple step manufacturing process.

One solution (used for example by Smart Packaging Solutions, France) is to use an etched antenna on a core sheet of dielectric material. Two extremities of the antenna, one on each side of the sheet, are enlarged to form the opposing electrode surface of a capacitor. By accurately choosing the two surface ratio, one can tune the capacitance of the element. A drawback of this method is that the antenna paths on each side of the sheet have to be connected electrically through the sheet.

Other solutions like connecting capacitors, closing antenna loops, etc. . . . all require additional manufacturing steps, most of the time with high technical difficulties and error potential. This complexity implies lower reproducibility and yield quality that are essential drawbacks for mass production.

A simplified version of a coupling device is to use a conductive structure as a resonator in order to increase the interaction of the transponder antenna with the magnetic field of the reader. Such a resonator can have different effects, and different forms. For example, the loading bar described in U.S. Pat. No. 6,285,342 is selectively adjusted to change the real part of the input impedance of a meander antenna.

In DE 100 10 936, a spiral resonator is described which is coupled with the loop antenna of a transponder. The spiral is formed by a metallic wire of diameter d. The size of the pitch (the mean distance between the turns of the spiral) p should be of 1 to 5 d in order to ensure a proper magnetic coupling with the loop antenna.

Another spiral resonator is disclosed in WO 06 125 916. The spiral winding is formed by a conductive path obtained by copper engraving. The path has a width of 0.15 mm. The pitch of the spiral winding is also 0.15 mm, as the distance between the coil of the antenna (of the transponder to be coupled to the resonator) and one (internal/external) turn of the spiral. As the extremities of the spiral winding are loose and there are stray capacitances between the turns of the spiral, current resonance can occur at a particular frequency. This current is then transmitted to the coil of the antenna also by capacitive coupling.

By contrast to the coupling device described above, the two spiral resonators described in these last examples show mainly a capacitive coupling behavior. No inductive coupling with the antenna of a transponder is possible as the effect of the stray capacitances are too large. A similar spiral resonator 5 is depicted in FIG. 2. The conductive path forms a spiral with loose ends. Reference herein to spiral refers to a continuous path that follows a winding course (geometrically around a point, a form or a shape) and that show a plurality of spaced turns. In the example shown here, the spiral has a rectangular geometry, but any other geometries are possible.

On the electrical level, an important parameter of such a resonator, beside the total length and the number of turns, is the distance between the turns. The mean distance between the turns of a spiral is herein called the pitch p of the spiral. If the pitch is small enough, stray capacitances 6 are created between different segments of the spiral that are parallel and close to each other. This is illustrated by the close view of FIG. 2, on the side of which one has also added the equivalent electrical diagram of this segment of the resonator circuit. As the extremities of the spiral windings are loose and there are stray capacitances between the turns of the spiral, the spiral acts like a transmission line in which a current resonance occurs at a particular frequency. The smaller the pitch, the stronger the interturn stray capacitances and the stronger the resonance. The stray capacitance diminishes very fast as the pitch increase. Being over 5 to 10 times the width of the conductive path, the stray capacitance becomes negligible.

The pitch as defined herein supposes regular spiral geometry with a constant winding increasing step. In reality, design and manufacturing constraints make it impossible to create a perfectly constant interturn distance. Therefore, the definition of pitch herein has to be understood as the mean interturn distance of the whole spiral (weighted on the length of the spiral).

Of interest is also the document WO 07 025 934, in which the resonance frequency of a spiral resonant circuit is tuned by varying the interturn spacing on a localized segment of the circumference of the spiral. Such a spiral has two portions showing each a different partial pitch. The pitch of the entire spiral has to be defined as the mean (weighted on the length of each portion) value of these.

SUMMARY OF THE INVENTION

It is an aim of the present invention to improve these known devices.

More specifically, it is a aim of the present invention to provide a coupling device for a transponder device that is easy to manufacture, in particular for contactless or dual-interface cards.

It is a further aim of the present invention to provide a coupling device for which the manufacturing process is simple to carry out, reliable and which produces devices of good quality, in particular by using one single manufacturing step, implying only one element and one technology and by avoiding the use of multiple electrical elements to be connected.

According to the present invention, the coupling device is formed by a continuous conductive path having a central section and two extremity sections, the central section forming at least a small spiral for inductive coupling with the transponder device, the extremity sections forming each one large spiral for inductive coupling with the reader device, wherein the small spiral shows a larger pitch than the ones of the large spirals, and wherein the two extremities of the continuous path are loose in such a way that the coupling device forms an open circuit.

The pitches of the large spirals are chosen so that interturn stray capacitances are considerable and that the large spirals have mainly a capacitive behaviour. The pitch of the small spiral is chosen so that the interturn stray capacitances are negligible, and that the small spiral has mainly an inductive behaviour.

One aspect of the invention is to use the interturn stray capacitances of the "primary antenna" of the coupling device to optimize the communication with the reader device, when the "secondary antenna" shows a mainly inductive behavior that is suitable for the inductive coupling to the transponder unit.

The manufacturing of the coupling device is therefore reduced to the manufacturing of a single continuous conductive path, but with a complex design. The design parameters are multiple and include: total antenna length, number of turn(s), dimensions, geometry, relative positioning, pitches, etc. All these design parameters are interdependent and their accurate determination is a complex empirical process. It has to be considered as a whole complex system interacting with the transponder unit in order to communicate optimally with an external reader.

In a preferred embodiment, the continuous conductive path is made by a conductive wire embedded on the surface of a substrate. The use of a conductive wire assures that the electrical and magnetic characteristics are constant and homogeneous all along the whole conductive path. Wire embedding is a fast, effective and well known manufacturing process. It is easy to program embedding heads for complex design achievement. Elements like small pitches or bridges (in particular if an insulated wire is used) are easy to achieve, even under mass production conditions (fast, reliable, reproducible, high quality and high yield).

The substrate can be a core layer for a smart card that can be laminated with the transponder unit in the body of the card. One embodiment may utilize the coupling device in relationship with a dual interface module, presenting contact pads at the surface of the card for a contact-type communication and an antenna integrated in the module in order to be coupled to the coupling device for a contactless-type communication.

BRIEF DESCRIPTION OF THE DRAWINGS

The invention will be better understood in the text below together with the following drawings.

DETAILED DESCRIPTION

Figure 3:
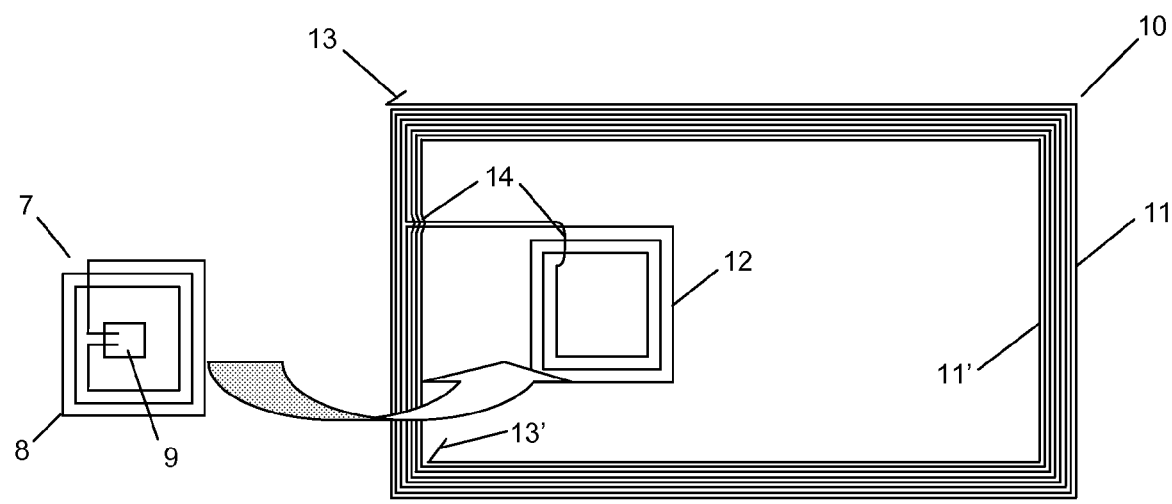
FIG. 3 shows a transponder device and a coupling device according to one embodiment of the present invention

FIG. 3 shows a first embodiment of the coupling device 10 of the invention. Such device is used to couple a transponder device 7 (represented here next to the coupling unit 10) with an external reader device not represented in this figure. The coupling device 10 is formed by a single conductive path having a central section and two external sections. The central portion is formed as a small spiral 12 with a large pitch, whereas the two external sections form a large spiral 11 and 11' with a small pitch. In fact, the spiral 11 and 11' are two distinct spiral physical elements, but forming a single geometrical spiral element (with a short interruption in the middle).

Starting from the loose extremity 13 on the external side of the device, the path forms first almost four turns of a large spiral 11 with a small pitch. This geometrical element is then stopped and the path extends then in the central region of the spiral 11 to form there a smaller spiral 12 of three turns and with a larger pitch. Once again, this geometrical element is stopped, and the conductive path goes back just next to the first interruption point. From there, the path forms a second large spiral 11', which is the geometrical continuation of the large spiral 11, with also almost four turns and approximately the same small pitch. In this embodiment, the distance of separation between the internal turn of the large spiral 11 and the external turn of the large spiral 11' is substantially constant and equal to the pitch of the large spirals.

In addition to the spiral elements 11, 11' and 12, the continuous path comprises also some small link portions, like the ones between the different bridges 14. In FIG. 3, the extremities 13 and 13' of the continuous path are also geometrically not part of the large spirals 11 and 11', but are formed as small free extensions of them. As long as they stay loose or do not form an additional radiating element, the exact form of these extremities is not relevant for the invention.

There are many ways to manufacture the continuous conductive path, such as for example: printing (by screen printing, ink-jet etc.), etching (plasma, electroplating), fixed (conductive band or metal surface, or wire for example), etc.

One embodiment of the present invention utilizes a conductive wire, preferably embedded on an substrate. As mentioned already above, the use of a conductive wire ensures that the electrical and magnetic characteristics are constant and homogeneous all along the whole conductive path. Wire embedding is a fast, effective and well known manufacturing process. It is easy to program embedding heads for a complex design achievement.

In FIG. 3, the continuous path is made by an insulated wire that has been embedded on a substrate (not shown). With the use of an insulated wire it is extremely advantageous to form bridge 14 along the path. Due to the complexity of the design (different spiral structures), one cannot avoid the use of bridge, where a path portion is crossing over (or under) another path portion. In many different technology processes, such as printing, etching, etc., the creation of a bridge portion is only possible by interrupting the manufacturing process of the conductive path, covering the bridged path portion with an isolation material, and restarting the manufacturing of the conductive path by forming a path portion over the isolation material. Such interruption, in the process and in the structure of the conductive path is considered a drawback. Therefore an advantageous embodiment is to use an insulated wire. When a wire portion is placed over another by the embedding head to form a bridge, the insulation of the wire ensures that no short circuit will occur. An alternative is to use non insulated wire and the process step described in DE 19 916 180.

The transponder device 7 represented next to the coupling device 10 on FIG. 3, is intended to be placed over the small spiral 12 (as shown by the arrow) in order to be coupled to the coupling device 10. The transponder device has an antenna 8 connected to a transponder chip 9 (integrated circuit). Any kind of transponder device can be used. The general idea is to use a small compact transponder device as for example coil-on-chip (as in EP 0 977 145), module with antenna (as in EP 0 875 039 and WO 07 026 077), air-bobbin (thin wire wound as a small annular (with some hundreds of turns: LF type) and directly bonded on the pads of the chip, as in EP 0 756 736). The transponder device 7 represented in FIG. 3 is purely symbolic, and neither the design of the antenna 8, nor its connection to the chip 9 should be understood as limiting the scope of the invention.

The geometry and dimensions of the antenna 8 must be as similar as possible to the ones of the spiral 12. When the antenna 8 is positioned over the spiral 12, the leads of the coils should extend at the slightest possible spacing from one another in order to couple inductively well. It doesn't mean that the design of the antenna 8 and of the spiral 12 should be absolutely identical. The design of the spiral 12 is submitted to different constraints than the transponder antenna: available space on the substrate, large pitch, diameter of the wire, etc. The more portions of the spiral 12 are parallel and close to portions of the antenna 8, the better the inductive coupling. Both elements can have differences like: physical nature (wire, printed, deposited, . . . ), number of turns, pitch, . . . .

It should be considered that the invention is not restricted to the design shown in the FIG. 3. One can have a plurality of small spirals 12 formed by the central portion of the continuous path. The small spiral 12 can also extend externally to the large spirals 11 and 11'. It all depends on the available surface.

Figure 1:
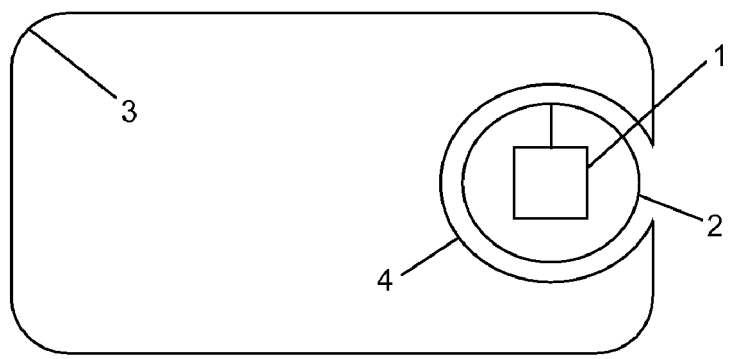
FIG. 1 shows a coupling device according to a known embodiment of the state of the art
Figure 2:
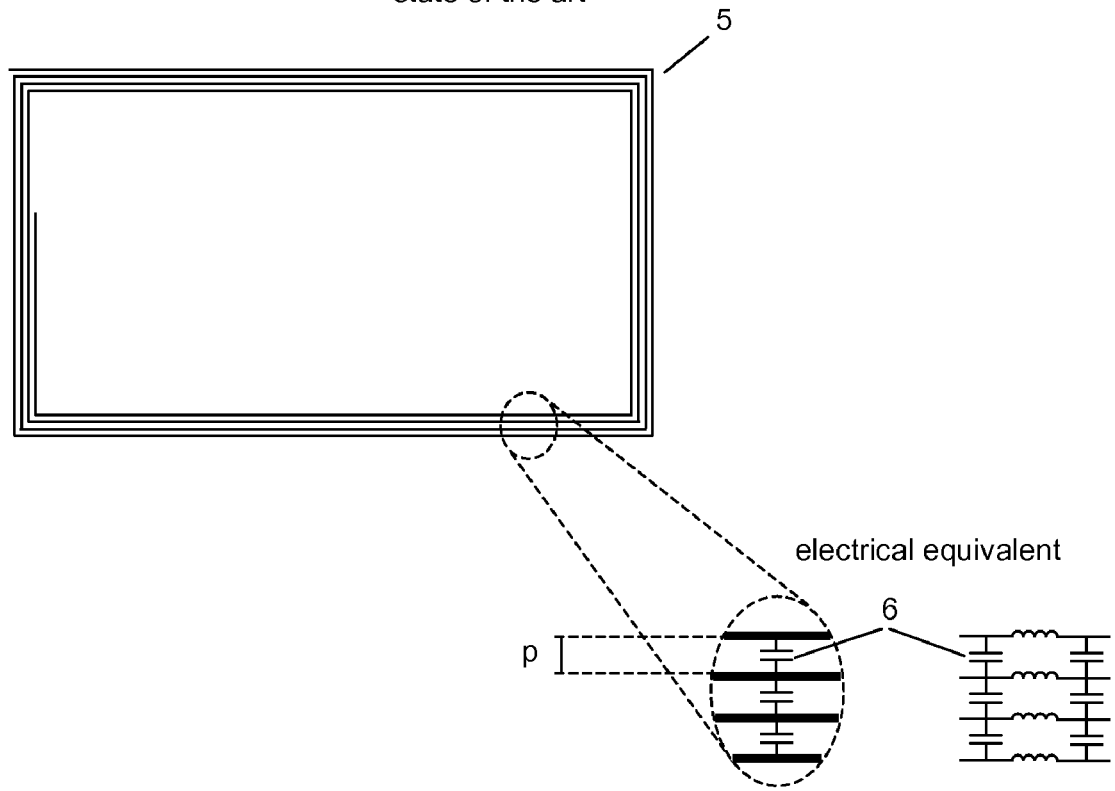
FIG. 2 shows a spiral resonator according to the state of the art
Figure 4:
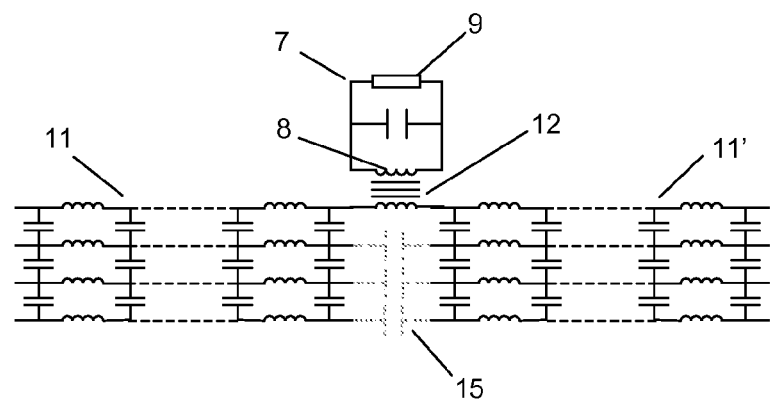
FIG. 4 shows a simplified theoretical electrical scheme equivalent to the embodiment shown in FIG. 3

FIG. 4 shows a simplified theoretical electrical diagram equivalent to the embodiment shown in FIG. 3. The two large spirals 11 and 11' are represented by the discrete succession of local interturn stray capacitances and local path portions impedances, as discussed above in the description of FIG. 2. The two spirals 11 and 11' act like a transmission line in which a current resonance occurs at a particular frequency. This current also circulates in the coil portion (small spiral) 12 facing directly the antenna 8, and an inductively generated corresponding current is generated in the transponder 7. Thus a RFID communication process can be achieved between an external RFID reader and the transponder chip 9, via the resonance current occurring in the large spirals 11 and 11'.

As said above, the determination of the design parameters is an empirical process. One is facing a complex system with interdependent parameters. It is also probable that the two large spirals 11 and 11' as represented in the FIG. 3 are coupled together, as there are at least additional stray capacitances between them. These additional coupling capacitances 15 have been added (on a hypothetical basis) in gray doted lines in the FIG. 4. The complete real equivalent electrical diagram of FIG. 3 is even more complex but the principles are illustrated in the present application.

Tests have shown that a wire-to-wire pitch minimization of the large spiral is one way to obtain optimal resonant frequencies. A pitch of the large spirals 11 and 11' approximately equivalent to the diameter of the wire used to form the conductive path appeared to be a good and practical solution (typically 100 micrometers for low frequency applications).

In accordance with at least one embodiment of the present invention, the geometry and dimensions of the antenna 8 should be as similar as possible to the ones of the spiral 12 (as discussed above). A pitch of the small spiral 12 approximately equivalent to five or ten times the diameter of the wire used to form the conductive path has shown to be a good and practical solution.

Finally, it has been shown that the two large spirals 11 and 11' should be as similar as possible. The more equivalent their electrical (and magnetic) properties, the better the current resonance and the better the performances of the coupling device. Ideally, the two spirals should be perfectly symmetrical, positioned one next to the other. But due to space constraint, this will often not be possible. One can play with differences in geometry (square, rounded, elliptic, etc.), in number of turns, in total length, in pitches, etc. The embodiment of FIG. 3 is an example of a practical solution. Any variation has to be understood as being part of the scope of this invention.

There is also another reason to have two large spirals 11 and 11', one on each side (according the continuous conductive path) of the small spiral 12. If one end of the small spiral 12 is loose and electrically "floating", no resonance is possible.

Figure 5:
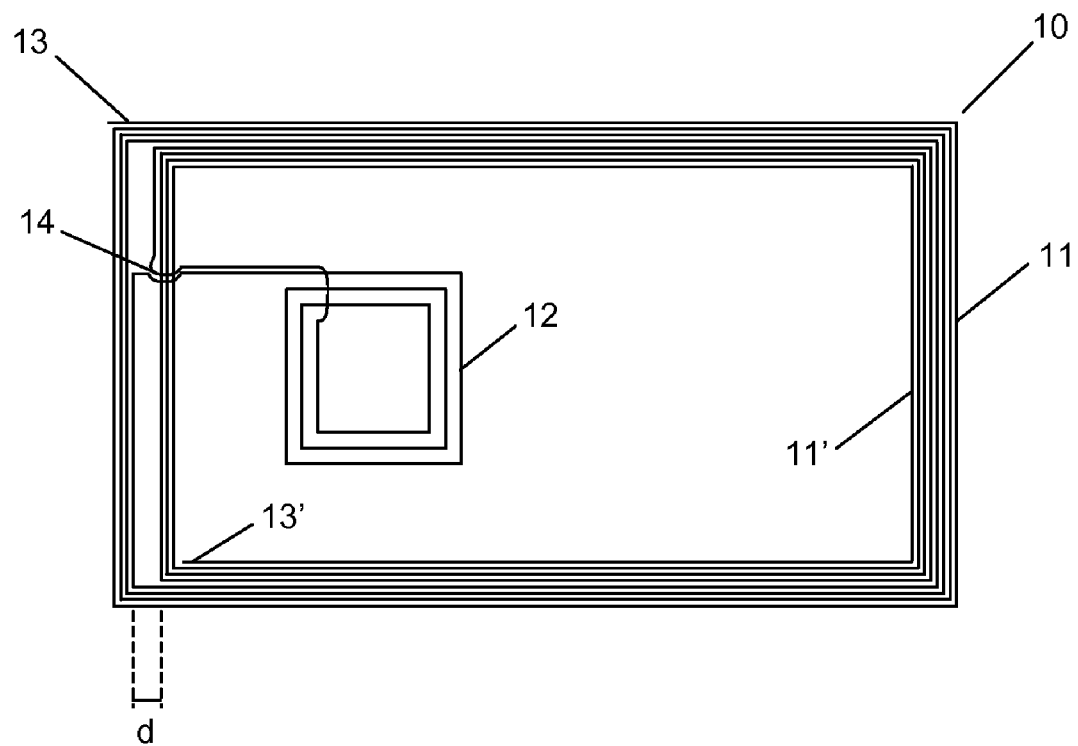
FIG. 5 shows a coupling device according to one embodiment of the present invention and FIG. 6 shows a coupling device according to one embodiment of the present invention.
Figure 6:
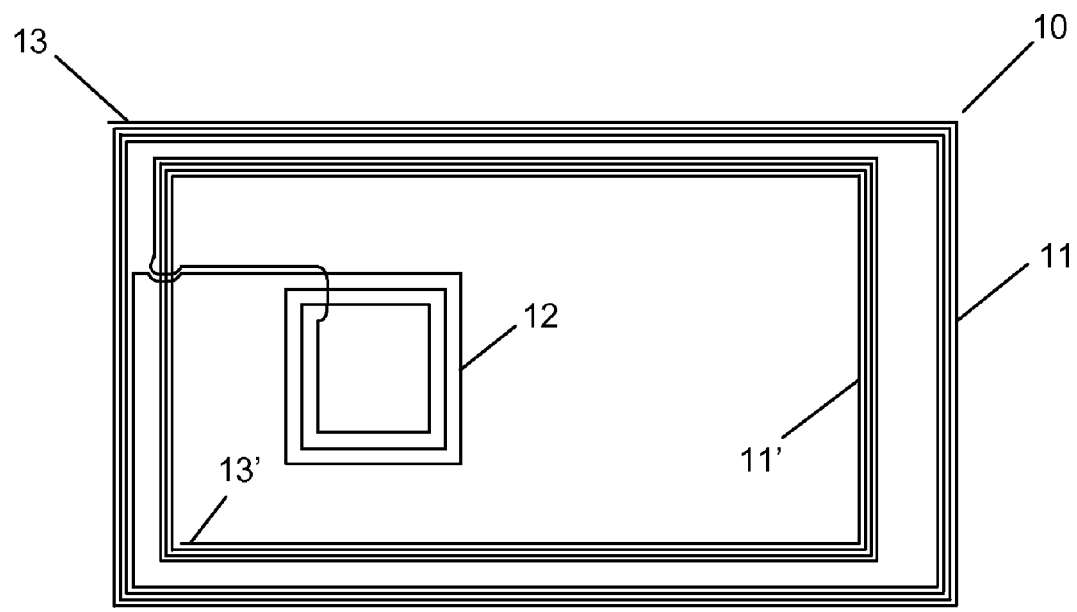

FIGS. 5 and 6 show two further embodiments of the coupling device 10 of the invention. In these cases, the two large spirals 11 and 11' show a distance of separation d that is much larger than their pitch. In FIG. 5, this gap exists only on one side of the perimeter of the respective large spirals, whereas on the other side, the distance of separation between the internal turn of the large spiral 11 and the external turn of the large spiral 11' is constant and equal to the pitch of the large spirals. The embodiment of FIG. 6 is even more extreme, as it shows different gaps (each much larger than the pitch of the large spirals) for each side of the large spirals 11 and 11'.

Due to technical constraints, one can be forced to modify the embodiment shown at FIG. 3, and face gaps d as described above. The consequence of such gaps is that there is less (case of FIG. 5) or no more (case of FIG. 6) capacitive coupling between the two large spiral 11 and 11'. Measurable performance decreases may occur when they are not interacting properly. Consequently, one has to form many more turns on each large spirals 11 and 11', in order to achieve optimal resonant frequencies. It impacts on the process quality (it becomes difficult to ensure a stable wire embedding—with constant pitch, ...) and reinforce the size constraint (in particular in the case a smart card with given ISO dimensions).

One solution to improve the performance of the system and to reduce the resonant frequency of the system is to add a resonator. As an example, one assumes that the coupling device 10 according the FIG. 5 has been manufactured by wire embedding on a PVC layer. On a second layer, a spiral resonator is manufactured also by wire embedding. This resonator has the same geometry and dimensions as the external large spiral 11. This spiral resonator can eventually have more turns (the number of turns must be chosen accurately with the desired resonant frequency) and has two loose ends. The two layers are then laminated together (eventually in a card body). By using a resonator and a coupling device together, one can avoid the use of an "unreasonable" number of turns for one of these elements, and one ensures at the same time optimal performances for the whole system. As shown above, the use of such a resonator is well known in the art, but its use in combination with a coupling device is also part of the invention.

LIST OF NUMERICAL REFERENCES 1 transponder chip
2 transponder antenna
3 primary antenna of the coupling device
4 secondary antenna of the coupling device
5 spiral resonator
6 interturn stray capacitance
7 transponder device
8 transponder chip
9 transponder antenna
10 coupling device
11 large spirals
12 small spiral
13 loose extremity
14 bridge
15 additional coupling capacitance

The invention claimed is:

1. A coupling device for coupling a transponder device comprising a transponder antenna connected to a transponder chip with a reader device, the coupling device comprising:
a continuous conductive path having a central section and two external sections, the central section forming at least a small spiral configured to inductively couple the coupling device with the transponder device, the external sections each forming one large spiral configured to inductively couple the coupling device with the reader device, wherein the small spiral of the central section shows a larger pitch than the pitches of the large spirals of the external sections, and wherein two extremities of the continuous path are loose, such that the coupling device forms an open circuit.

2. A coupling device according claim 1, wherein the pitches of the large spirals are chosen such as that the interturn stray capacitances are significant and that the large spirals have mainly a capacitive behaviour.

3. A coupling device according to claim 1, wherein the pitch of the small spiral is chosen such as that the interturn stray capacitances are negligible, and that the small spiral has mainly an inductive behaviour.

4. A coupling device according to claim 1, wherein the pitches of the two large spirals are approximately equal.

5. A coupling device according to claim 1, wherein one of said large spirals is an outer spiral and the other of said large spirals is an inner spiral, the distance of separation between the internal turn of the outer large spiral and the external turn of the inner spiral is constant and approximately equal to the pitch of the large spirals.

6. A coupling device according to claim 1, wherein the conductive path is made by a single continuous wire.

7. A coupling device according to claim 6, wherein the wire is embedded on a surface of a substrate.

8. A coupling device according to claim 6, wherein the pitches of the large spirals are approximately equivalent to a diameter of the wire.

9. A coupling device according to claim 1, wherein the small spiral has approximately the same dimensions as the transponder antenna.

10. A smart card comprising:
a transponder device inductively coupled to a coupling device comprising a continuous conductive path having a central section and two external sections, the central section of the coupling device forming at least a small spiral configured to inductively couple the coupling device with the transponder device, the external sections of the coupling device each forming one large spiral and each being configured to inductively couple the coupling device with the reader device, wherein the small spiral of the central section shows a larger pitch than the pitches of the large spirals of the external sections, and wherein two extremities of the continuous path are loose, such that the coupling device forms an open circuit, wherein the coupling device has been formed on a core layer of the smart card.

11. A smart card according to claim 10, wherein the transponder device is a dual interface module, with a transponder antenna mounted on the module.

12. A smart card according to claim 10, wherein one of the large spirals has approximately the same dimensions as the smart card.

13. A smart card according to claim 10, wherein a spiral resonator having approximately the same dimensions as one of the large spirals is placed in the card body in vertical proximity to one of the large spirals.

\* \* \* \* \*